(12) United States Patent
Janiesch et al.

(10) Patent No.: US 8,042,090 B2
(45) Date of Patent: Oct. 18, 2011

(54) INTEGRATED CONFIGURATION OF CROSS ORGANIZATIONAL BUSINESS PROCESSES

(75) Inventors: Christian Janiesch, Muenster (DE); Alexander Dreiling, Kelvin Grove (AU); Ulrike B. Greiner, Eggenstein-Leopoldshafen (DE); Sonia Lippe, Hill End (AU)

(73) Assignee: SAP AG, Walldorf (DE)

( * ) Notice: Subject to any disclaimer, the term of this patent is extended or adjusted under 35 U.S.C. 154(b) by 1366 days.

(21) Appl. No.: 11/603,736

(22) Filed: Nov. 21, 2006

(65) Prior Publication Data
US 2008/0098355 A1    Apr. 24, 2008

Related U.S. Application Data

(60) Provisional application No. 60/848,459, filed on Sep. 29, 2006.

(51) Int. Cl.
*G06F 9/44* (2006.01)

(52) U.S. Cl. ........ 717/102; 717/104; 717/107; 717/110; 717/120; 709/206; 709/220

(58) Field of Classification Search .................. None
See application file for complete search history.

(56) References Cited

U.S. PATENT DOCUMENTS

| | | | | |
|---|---|---|---|---|
| 5,581,764 A * | 12/1996 | Fitzgerald et al. | ............. | 709/223 |
| 6,061,665 A * | 5/2000 | Bahreman | ...................... | 705/40 |
| 6,311,226 B1 * | 10/2001 | Rosen et al. | ................... | 719/310 |
| 6,550,057 B1 * | 4/2003 | Bowman-Amuah | .......... | 717/126 |
| 6,684,383 B1 * | 1/2004 | Natori et al. | ................... | 717/107 |
| 6,721,776 B1 * | 4/2004 | Erickson et al. | .............. | 718/101 |
| 6,757,689 B2 * | 6/2004 | Battas et al. | ........................ | 1/1 |
| 6,871,346 B1 * | 3/2005 | Kumbalimutt et al. | ....... | 718/104 |
| 6,968,535 B2 * | 11/2005 | Stelting et al. | ................ | 717/104 |
| 6,983,449 B2 * | 1/2006 | Newman | ....................... | 717/121 |
| 6,990,636 B2 * | 1/2006 | Beauchamp et al. | ......... | 715/764 |
| 7,222,345 B2 * | 5/2007 | Gray et al. | .................... | 718/104 |
| 7,313,782 B2 * | 12/2007 | Lurie et al. | .................... | 717/104 |
| 7,526,734 B2 * | 4/2009 | Vasilev et al. | ................. | 715/805 |
| 7,721,283 B2 * | 5/2010 | Kovachka-Dimitrova et al. | ............................. | 717/177 |
| 2002/0033843 A1 * | 3/2002 | Loos et al. | .................... | 345/740 |
| 2002/0082856 A1 * | 6/2002 | Gray et al. | ....................... | 705/1 |
| 2002/0116698 A1 * | 8/2002 | Lurie et al. | .................... | 717/100 |

(Continued)

OTHER PUBLICATIONS

Title: An analysis Framework of Enterprise Documents for Business Strategy Design, author: Akiyoshi et al, source: IEEE, dated: Nov. 28, 2005.*

(Continued)

*Primary Examiner* — Chameli Das
(74) *Attorney, Agent, or Firm* — Schwegman, Lundberg & Woessner, P.A.

(57) ABSTRACT

Embodiments of configuring elements of a first enterprise system (ES) and a second ES in mechanisms are described generally herein. For example, in an enterprise system (ES) module for a first ES may include a plurality of configurable elements and a configuration module. The configuration of a first configurable element of the plurality of configurable elements may affect the configuration of a second configurable element of a second ES. The configuration module may configure the a portion of the plurality of the configurable elements of the first ES based on a configuration of the first configurable element. The configuration module may further and generate a configuration element information (CEI) message for the second ES that includes an indication of the configuration of the first configurable element. Other embodiments may be described and claimed.

21 Claims, 4 Drawing Sheets

U.S. PATENT DOCUMENTS

| | | | | |
|---|---|---|---|---|
| 2002/0198727 | A1* | 12/2002 | Ann et al. | 705/1 |
| 2003/0197733 | A1* | 10/2003 | Beauchamp et al. | 345/764 |
| 2004/0249854 | A1* | 12/2004 | Barnes-Leon et al. | 707/103 Y |
| 2005/0005259 | A1* | 1/2005 | Avery et al. | 717/103 |
| 2005/0027871 | A1* | 2/2005 | Bradley et al. | 709/227 |
| 2005/0081186 | A1* | 4/2005 | Tigani et al. | 717/101 |
| 2005/0144619 | A1* | 6/2005 | Newman | 717/177 |
| 2006/0015724 | A1* | 1/2006 | Naftali et al. | 713/168 |
| 2007/0022383 | A1* | 1/2007 | Barker et al. | 715/733 |
| 2007/0022404 | A1* | 1/2007 | Zhang et al. | 717/103 |
| 2007/0094641 | A1* | 4/2007 | Darr et al. | 717/121 |
| 2009/0183138 | A1* | 7/2009 | Loos et al. | 717/105 |

OTHER PUBLICATIONS

Title: Architecture—Centered Enterprise System Development and Integeration, author: Wreder et al, source: IEEE, dated: Oct. 27, 1999.*

"UN/CEFACT Modeling Methodology (UMM) User Guide: CEFACT/TMG/N093", http://www.ifs.univie.ac.at/untmg/artifacts/UMM_User_Guide 2003-09-22.pdf, United Nations Centre for Trade Facilitation and Electronic Business,(Accessed Feb. 22, 2006),1-226.

Agrawal, A , et al., "Generative Programming via Graph Transformations in the Model-Driven Architecture", *OOPSLA Workshop on Generative Techniques in the Context of Model Driven Architecture*, Seattle, 2002, 1-11.

Becker, J , et al., "Configurative Process Modeling—Outlining an Approach to Increased Business Process Model Usability", *Proceedings of the 15th Information Resources Management Association Conference (IRMA 2004)*, New Orleans, (2004),615-619.

Bosak, J , et al., "Universal Business Language 2.0 Public Review Draft, Organization for the Ad-vancement of Structured Information Standards (OASIS)", http://docs.oasis-open.org/ubl/prd-UBL-2.0/, (Jan. 19, 2006).

Crawford, C , "Core Components Technical Specification—Part 8 of the ebXML Framework, United Nations Centre for Trade Facilitation and Electronic Business (UN/CEFACT)", http://www.unece.org/cefact/ebxml/CCTS_V2-01_Final.pdf, (Nov. 15, 2003), 1-113.

Davenport, T , "Putting the Enterprise into the Enterprise System", *Harvard Business Review*, (1998),121-131.

Ferstl, K , et al., "SOM Modeling of Information Systems", *In Handbook on Architectures of Information Systems*, vol. I., P. Bernus, K. Mertins, G. Schmidt (eds.), Springer-Verlag,(1988),339-358.

Glushko, R J., et al., *Document Engineering—Analyzing and Designing Documents for Business Informatics and Web Services*, Cambridge Mass. : MIT Press, ; ISBN: 0262072610,(2005).

Greiner, U , et al., "Designing and Implementing Cross-Organizational Business Processes—Description and Application of a Modeling Framework", *In Proceedings of the Interoperability for Enterprise Software and Applications Conference*, (I-ESA 2006), Bordeaux,(2006).

Klaus, H , et al., "What is ERP?", *Information Systems Frontiers* 2(2), (2002), 141-162.

Markus, C. , "The Enterprise System Experience—From Adoption to Success", *In: Framing the Domains of IT Research—projecting the future-through the past*, R. W. Zmud (ed.), Cincinnati, Ohio : Pinnaflex Education Resources, Inc., ; ISBN: 1893673065,(2000), 173-207

Open Applications Group, Inc., "Open Applications Group Integration", http://www.openapplications.org/downloads/oagidownloads.htm, Accessed Feb. 22, 2006,(2006).

Rosemann, M , "A Configurable Reference Modelling Language", *Information Systems, In Press*, (2005).

Roussinov, D G., et al., "Document Clustering for Electronic Meetings—An Experimental Comparison of Two Techniques", *Decision Support Systems* 27(1-2), (1999),67-79.

Soffer, P , et al., "ERP Modeling—A Comprehensive Approach", *Information Systems Frontiers* 28(6), (2005),673-690.

Soley, R , et al., *OMG Staff Strategy Group Model Driven Architecture*, Object Management Group White Paper, Draft 3.2,(Nov. 27, 2000),1-12.

Zachman, J A., "A Framework for Information Systems Architecture", *IBM Systems Journal* 26(3), (1987),277-293.

* cited by examiner

INTEGRATED CONFIGURATION OF CROSS ORGANIZATIONAL BUSINESS PROCESSES

CLAIM OF PRIORITY

The present patent application claims the priority benefit of the filing date of U.S. provisional application No. 60/848,459 filed Sep. 29, 2006, the entire content of which is incorporated herein by reference.

TECHNICAL FIELD

Various embodiments described herein relate generally to enterprise systems (ES), including apparatus, systems, and methods used in multiple ES.

BACKGROUND INFORMATION

A user organization may employ a commercial off-the-shelf (COTS) software package to support operations and management. The software package may be part of an enterprise system (ES) where the ES includes technology and business expertise for a particular enterprise. A service-oriented architecture (SOA) ES may require modeling cross organizational business processes and documents. An ES may provide flexible modeling of numerous process and document variants. In an SOA ES exchanged documents or messages may provide binding agreements between organizations and be closely tied to underlying cross organizational processes. Flexible modeling of SOA ES may produce unmanageable variant combinations.

DETAILED DESCRIPTION

Figure 1:
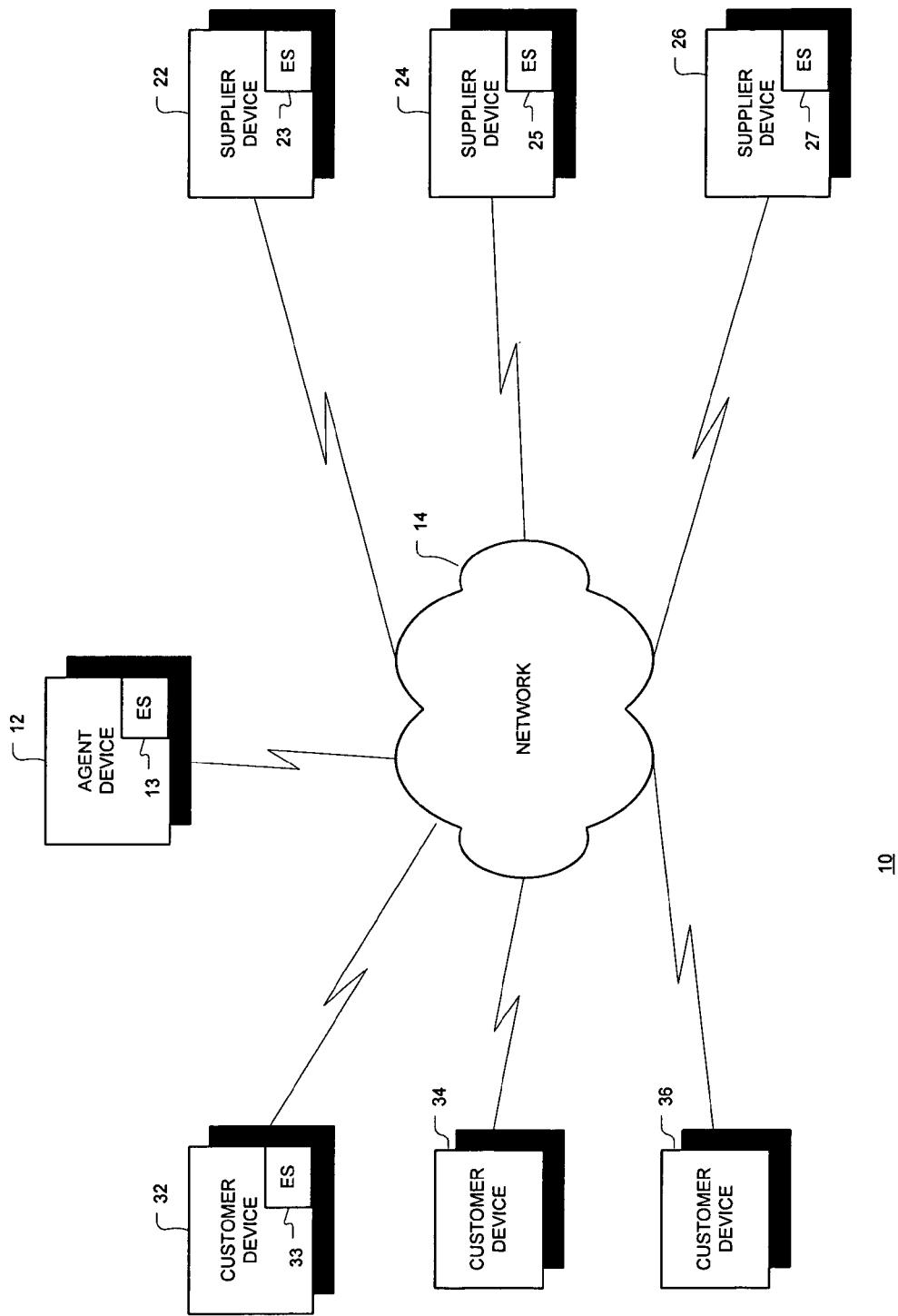
FIG. 1 is a block diagram of SOA ES architecture according to various embodiments.

FIG. 1 is a block diagram of an SOA ES architecture 10 comprising customer devices (CD) 32, 34, 36, agent device (AD) 12, and supplier devices (SD) 22, 24, 26 according to various embodiments. Each CD 32, 34, 36 may be coupled to the AD 12 via a network 14 where the network may be a local wired or wireless network or a network of networks such as the Internet. Each SD 22, 24, 26 may also be coupled to the AD 12 via the network 14 where the network may be a local wired or wireless network or a network of networks such as the Internet. In an embodiment the AD 12 includes an ES 13 where the ES 13 may be configured to communicate messages between CDs 32, 34, 36 and the AD 12. The ES 13 may also be configured to communicate messages between the AD 12 and the SDs 22, 24, and 26. Each SD 22, 24, 26 may have an ES 23, 25, 27 that may be configured to communicate messages between the AD 12 and itself. Each ES 13, 23, 25, 27 may represent an organization having processes and document or message protocols. In an embodiment, a CD 32 may have an ES 33 to process messages from and generate messages for an AD 12. In an embodiment the AD 12 ES 13 may be managed by a first organization, the CD 32 ES 33 may be managed by a second organization, and one or more of the SD 22 ES 23, SD 24, ES 25, SD 26 ES 27 may be managed by a third organization.

Figure 2:
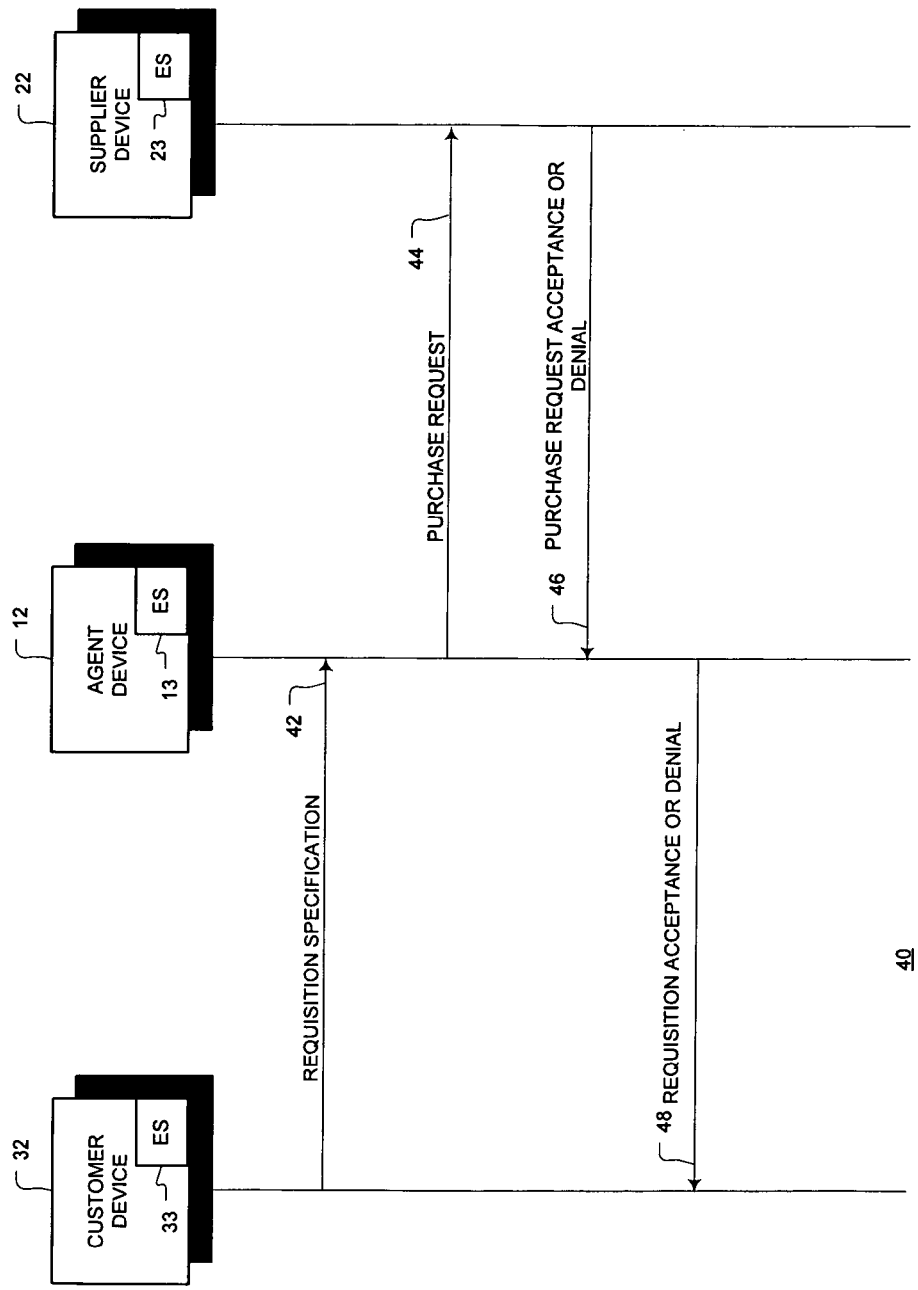
FIG. 2 is a diagram of document or message communication between organizations in SOA ES architecture according to various embodiments.

FIG. 2 is a diagram of document or message communications 40 between an AD 12, a CD 32, and a SD 22 according to various embodiments. A supplier may provide goods or services and an agent may broker requests for goods or services from a customer to the supplier. In an embodiment, a customer via a CD 32 may generate a requisition specification message (RSM) or document 42 and forward the RSM to an agent for fulfillment via an AD 12. The agent via an AD 12 may review the RSM 42 and generate a purchase request message (PRM) 44 and forward it to a selected supplier's SD 22. In an embodiment the AD 12 ES 13 may be managed by a first organization, the CD 32 ES 33 may be managed by a second organization, and the SD 22 ES 23 may be managed by a third organization Accordingly messages 42, 48 between the CD 32 ES 33 and the AD 12 ES 13 may be cross organizational messages. Similarly, messages 44, 46 between the SD 22 ES 23 and the AD 12 ES 13 may be cross organizational messages.

The supplier via the SD 22 may review the PRM 44 and generate a PR acceptance or denial message PRADM 46 accordingly and forward the PRADM 46 to the AD 12 for review. The agent via the AD 12 may receive the PRADM 46 and generate a requisition acceptance or denial message RADM 48. The agent via the AD 12 may forward the RADM 48 to the CD 32. The AD 12 may employ an ES 13 to automate the processing of RSMs 42 and PRADMs 46 and generating PRMs 44 and RADMs 48 when appropriate. Similarly the SD 22 may employ an ES 23 to process PRMs 44 and generate PRADMs 46 when appropriate. The CD 32 may employ an ES 33 to generate RSMs 42 and process RADMs 48.

It is noted that the RSM 42, PRM 44, PRADM 46, and RADM 48 may include a predetermined number of fields in a predetermined format and order. The ES 13 may be required to have knowledge about the RSM generated by any CD 32 and the PRADM 46 generated by any SD 22. The ES 13 may format the PRM 44 based on the recipient SD 22. The SD 22 ES 23 may also have knowledge about the format of PRM 44 messages received from an AD 12 and may format the PRADM 46 based on the recipient AD 12. Messages 42, 44, 46, 48 betweens ES 33, 13, 23 may be configured based on a contextualization standard including a core component technical specification (CCTS), e.g., an automotive order contextualization standard. Implementation of the CCTS may require process and document modifications in each ES 13, 23, 33. In an embodiment one of the CD 32, AD 12, or SD 22 may implement one or more process or document changes that may affect one or more processes or documents in others devices 32, 12, 22.

For example, the SD 22 may require that all received purchase requests 44 include a customer credit status indication. Accordingly, the SD 22 may configure its ES 23 to expect a credit status indication field in all PRM 44 and include a process or algorithm to evaluate the credit status indication field along with other fields of PRM 44. An AD 12 providing purchase requests 44 to such an SD 22 may be required to configure its purchase request to include a customer credit status indication. Accordingly, the AD 12 ES 13 may need to be configured to determine a customer's credit status (process configuration) and include an indication of the customer's credit status in any purchase requests 44 (document configuration). Further the AD 12 ES 13 may require an RSM 42 from a CD 32 to include one or more fields (document configuration) providing data needed to determine a corresponding customer's credit status. The CD 32 ES 33 may need to be configured to determine, provide, or populate one or more customer identification fields (process configuration) for each requisition specification 42 (document configuration) forwarded to the AD 12.

In another embodiment, the AD 12 may control one or more aspects of the purchase request 44 record or message configuration including whether the record includes a corresponding customer credit status. The AD 12 may configure the purchase request 44 record not to include a customer credit status field (document configuration). Accordingly, the AD 12 ES 13 may not evaluate one or more fields of a RSM 42 to determine, provide, or populate a customer credit status field in a PRM 44 (process configuration). The CD 32 may or may not be required to include determine, provide, or populate one or more customer identification fields (process configuration) for each RSM 42 (document configuration) forwarded to the AD 12. The customer identification fields may be forwarded in the PRM 44 (document configuration) so a SD 22 ES 23 may determine a customer's credit status (process configuration) based on customer identification fields provided in a purchase request 44.

Further in an embodiment the CD 32 ES 33 may not fill, populate, or include customer identification fields (process configuration) in RSM 42 forwarded to the AD 12 ES 13. The AD 12 ES 13 may not determine customer credit status (process configuration) and may not include or populate customer credit status fields in a PRM 44 forwarded to SD 22 ES 23 (document configuration). The AD 12 ES 13 may also not include or populate customer identification fields in a purchase request 44 messages forwarded to SD 22 ES 23 (document configuration). The SD 22 ES 23 may not evaluate the customer credit status and may not evaluate the customer identification fields (process configuration) for purchase requests received from the AD 12 ES 13. Accordingly, a process decision of a CD 32 not to include or populate customer identification fields in a RSM 42 may affect document configuration (42, 44) and process configuration in the AD 12 ES 13 and SD 22 ES 23. Similarly, a process decision of one of the AD 12 or SD 22 to determine or to require customer credit status may affect document configuration of the messages 42, 44 and process configuration of the CD 32, AD 12, and SD 22. Accordingly there may be a correlation between process modifications and document modifications in an ES (13, 23, 33) and across multiple organizations (different ES 13, 23, 33).

Figure 3:
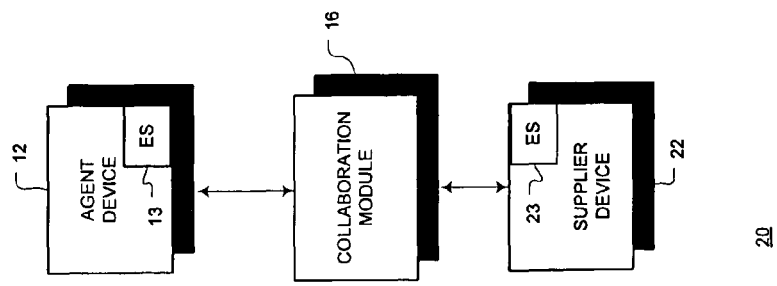
FIG. 3 is a block diagram of cross organization collaboration according to various embodiments.

FIG. 3 is a block diagram of cross organization collaboration 20, according to an example embodiment. An AD 12 ES 13 and a SD 22 ES 23 may be coupled to a collaboration module 16. Depending on the ES 13 and ES 23 and relationship between an agent and supplier: a) the AD 12 ES 13 may specify the format of messages it generates for and accepts from the SD 22 ES 23; b) the SD 22 ES 23 may specify the format of messages it generates for and accepts from the AD 12 ES 13; c) the AD 12 ES 13 may specify the format of messages that it accepts from the SD 22 ES 23 and the SD 22 ES 23 may specify the format of messages that it accepts from the AD 12 ES 13; and d) a third party may set the format for messages between ADs and SDs, set as a standardization organization (CCTS).

In order to enable communication between an AD 12 ES 13 and SD 22 ES 23, a negotiation regarding message format and the underlying ES 13 and ES 23 processes may be performed. The AD 12 ES 13 and SD 22 ES 23 may each communicate message format requirements to the collaboration module 16. The collaboration module 16 may collect the requirements and provide the requirements to the ES 13 and ES 23 accordingly. It is noted that each SD 22, SD 24, SD 26 may have different requirements or expectations for messages it receives or generates. In order to accommodate various ESs 23, 25, 27, the ES 13 may configure its business processes differently as related to each ES 23. 25, 27. These ES 13 business processes may determine message formats for both reception and transmission. Supporting different ESs 23, 25, 27 may require numerous business process variations.

Figure 4:
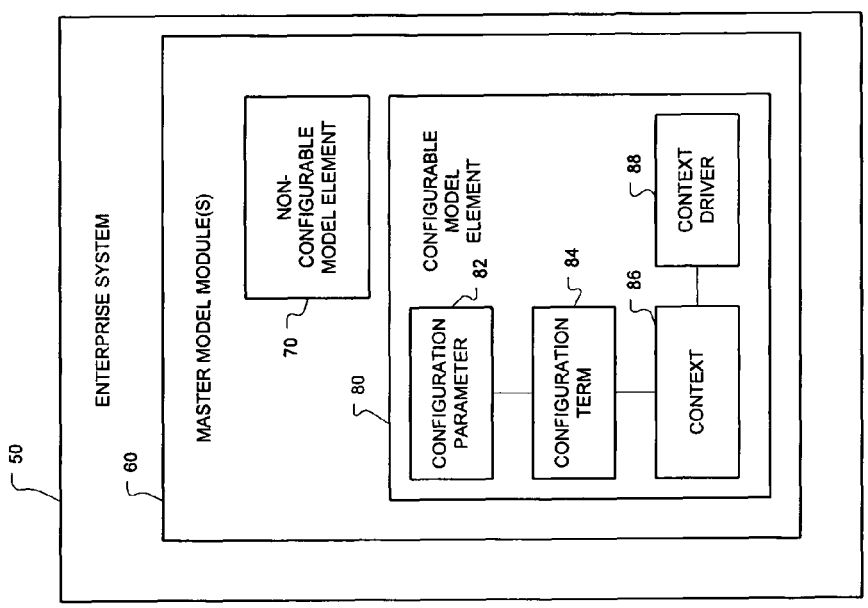
FIG. 4 is a block diagram of an ES according to various embodiments.

FIG. 4 is a block diagram of an ES 50 according to various embodiments. The ES 50 may be employed in a CD, AD, SD, or other processing device. To limit possible variations while permitting model modifications to accommodate collaboration between one or more ES's, the ES 50 includes one or more master model module(s). Each module may be related to a specific enterprise. Each master model 60 may include non-configurable model elements 70 and configurable model elements 80. A user may select a specific master model based on its correlation to their enterprise such as a SOA ES or correlation with a specific contextualization standard such as CCTS.

Figure 5:
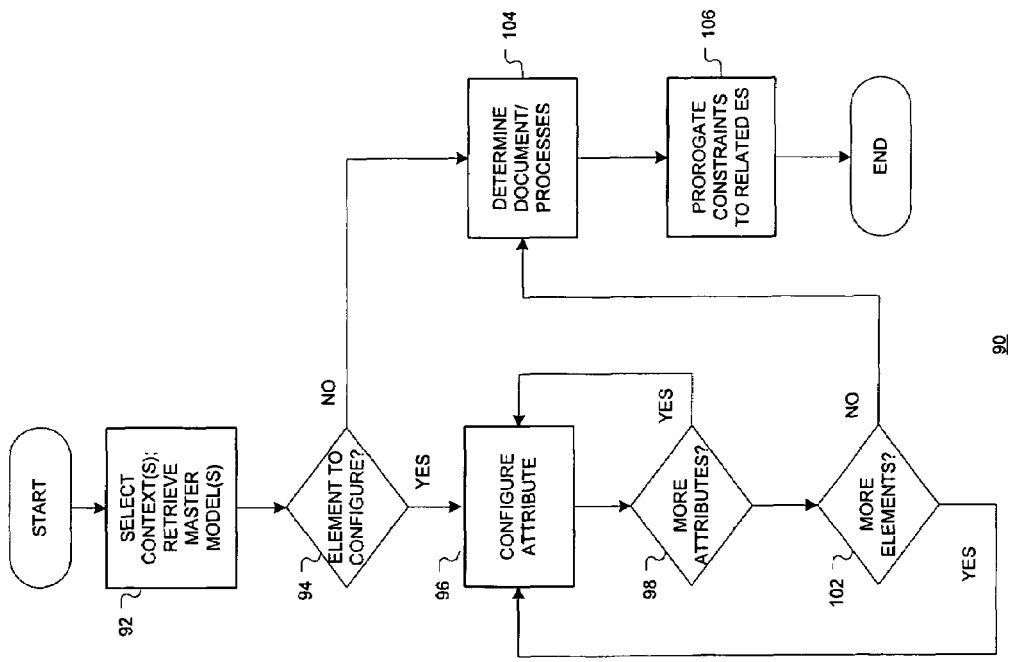
FIG. 5 is a flow diagram illustrating several methods according to various embodiments.

Each configurable model element 80 may have modifiable object attributes such as configuration parameters 82 where an object may be a document or process. In an embodiment one or more configuration terms 84 may determine how or when to configure an object parameter 82. A context 86 may define the value of one or more configuration terms 84. The context 86 may relate to a specific enterprise or variations due to collaboration with other ES. A context driver 88 may create one or more contexts 86. A related ES may provide configurable element information (CEI). The CEI may affect a context driver 88, a context 86, or configuration term 84 in an embodiment. The context 86 or context driver 88 may be related to contextualization standard such as CCTS or other message, document or process standardization protocol or configuration. The method 90 shown in FIG. 5 may be employed to configure an ES model.

The method 90 may enable a user to select one or more context(s) related to their deployment and retrieve a master ES model related to the selected contexts or contextualization (activity 92). The method may then determine whether any configurable elements remain to be configured in the selected model (activity 94). In an embodiment a configurable element may include one or more attributes to be configured. As noted attributes may relate to one or more processes to be performed by an ES. An attribute configuration may also affect the configuration of one or documents or messages to be generated by or received by an ES. Further each attribute configuration may be related to a configuration parameter 82 or configuration term 84 and may be applied to context 86 or context driver 88.

The method 90 may enable a user to configure an attribute (activity 96). An attribute configuration may be determined as a function of collaboration between the ES and another ES. The method 90 may continue configuring attributes until all attributes for the element have been configured (activities 96, 98). The method 90 may continue configuring master model elements until all elements have been configured (activity 102). In the AD, CD, SD architecture a AD ES may use a master model related to processing requisition messages and generating purchase requests messages. Configurable elements may include whether to determine customer's credit status, type of credit check, and format of the credit status indication. The related attributes may include a requisition message format for customer identifiers that may be used to determine the customer's credit status indicator, the process of determining a customer's credit status, and the format of one or more fields providing the customer credit status indicator(s).

Attribute configuration may affect one or more processes or documents for other ES. The method 90 may determine whether a process or document or message for another ES may be affected for each attribute configuration (activity 104). In the example presented above, a customer's credit status indication may be provided by an AD ES. When the AD ES related process and documents are configured the method 90 may determine that any requisition requests from a CD may need to populate or include customer identification fields (process and document configuration for related CD). The method 90 may also determine that purchase requests from the AD to a SD may include one or more populated customer credit status indications and inform an SD ES of such a message format, affecting processes and expected document or message format for a related SD ES.

The method 90 may generate one or more constraint or information messages to related ES (such as to CD or SD) based on updated or configured attributes (activity 98) and determine relationship or affect to other ES (activity 104). In an embodiment any attribute configuration may be prorogated to other ES where the receiving ES may determine whether the attribute configuration affects any processes or document or message formats. In an embodiment one or more element configurations may generate configuration parameters for a related ES (subject to collaboration or CBP). The method 90 may generate a CEI for each configuration parameter or attribute configuration (activity 98) to be forwarded to a related ES and forward or prorogate each CEI to the related ES (activity 106).

Figure 6:
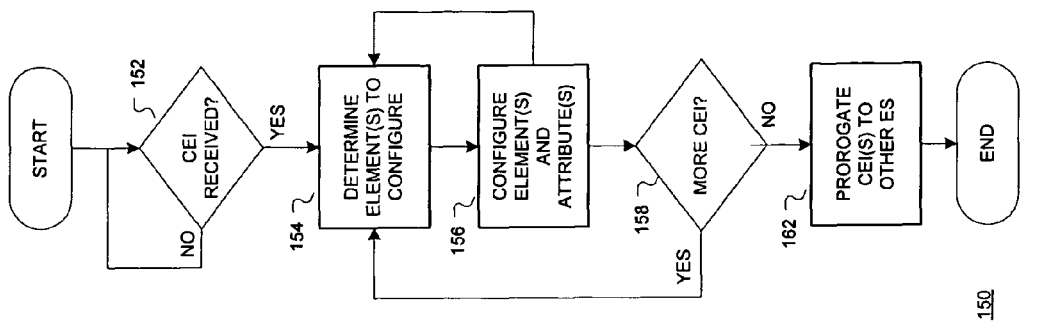
FIG. 6 is a flow diagram illustrating several methods according to various embodiments.

The element to be configured (activity 94) may be determined by a CEI received from another ES depending on the relationship between an ES and CEI prorogating ES and the model implemented by the ES. In an embodiment, the method 150 shown in FIG. 6 may be employed to configure elements of an ES based on received CEI(s). The method 150 may determine whether a CEI has been received (activity 152). The method 150 may evaluate the received CEI to determine whether any local ES elements need to be configured or modified (activity 154). In an embodiment the CEI message may indicate attribute configuration(s) for one or more elements of the ES that generated the CEI message. Further the CEI message format may be contextualized or adapted to conform to one or more standards.

The CEI may be rejected or ignored depending on the issuing ES. After determining the element(s) to be configured based on the CEI, the method may configure the elements and related attributes (activity 156). The method 150 may determine that the CEI affects a process, document, or message of the ES. The method 150 may determine whether one or more configurable model elements are affected by CEI message information. The method 150 may then determine the processes, documents, or messages that are related to the affected model elements.

The method 150 may continue to configure model elements based received CEI(s) (as a function of the relationship with the issuing ES) (activity 158). In an embodiment the method 150 may forward or generate new CEI for other related ES whose element(s) (processes or communications therebetween) may need to be configured based on the received CEI(s) (activity 162). In an embodiment element configurations may be prorogated to several CBP ES(s).

Accordingly several ES may automatically be configured based on modifications of a master, related ES. Such an embodiment may limit variants between related ES given limited possible variations of a related master ES.

Figure 7:
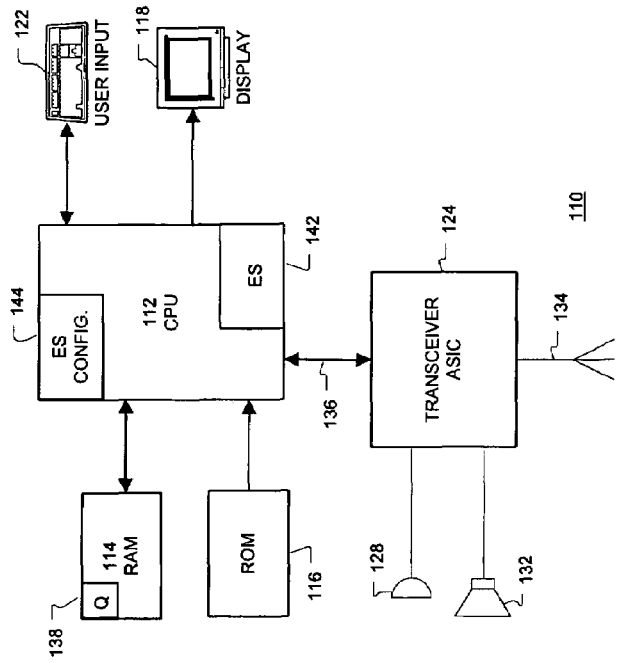
FIG. 7 is a block diagram of an article according to various embodiments.

A device 110 is shown in FIG. 7 that may be used in various embodiments as a CD 32, 34, 36, AD 12, or SD 22, 24, 26. The device 110 may include a central processing unit (CPU) 112, a random access memory (RAM) 114, a read only memory (ROM) 116, a display 118, a user input device 122, a transceiver application specific integrated circuit (ASIC) 124, a microphone 128, a speaker 132, and an antenna 134. The CPU 112 may include an ES module 142 and an ES configuration module 144. The RAM 114 may include a CEI queue 138 that may be used to store CEI(s) received from ES(s).

In an embodiment, the ES module 142 and the ES configuration module 144 may be separate elements. The ES configuration module 144 may configure elements of the ES module 142 based on user inputs 122 or received CEI messages. The ES module 142 may perform business processes, generate messages for related ES, and process messages from related ES according to non-configurable and configurable elements.

The ROM 116 is coupled to the CPU 112 and may store the program instructions executed by the CPU 112, the ES configuration module 144, and the ES module 142. The RAM 114 is coupled to the CPU 112 and may store temporary program data, overhead information, model configuration elements, and CEI queue 138. The user input device 122 may comprise an input device such as a keypad, touch pad screen, track ball, or other similar input device that allows the user to navigate through menus in order to operate the device 110. The display 118 may be an output device such as a CRT, LCD or other similar screen display that enables the user to read, or view ES related information.

The microphone 128 and the speaker 132 may be incorporated into the device 110. The microphone 128 and the speaker 132 may also be separated from the device 110. Received data may be transmitted to the CPU 112 via a bus 136 where the data may include data received, data to be transmitted, or protocol information. The transceiver ASIC 124 may include an instruction set necessary to communicate data signals with the architecture 10 (FIG. 1). The ASIC 124 may be coupled to the antenna 134 to communicate signals within the architecture 10. When a data signal is received by the transceiver ASIC 124, the data may be transferred to the CPU 112 via the bus 136. The data may include overhead information, ES related data or CEI(s) to be processed by the device 110 in accordance with the methods described herein.

Any of the components previously described can be implemented in a number of ways, including embodiments in software. Thus, the CPU 112, ES configuration module 144, ES module 142, RAM 114, ROM 116, CEI queue 138, transceiver ASIC 124, antenna 134, microphone 128, speaker 132, user input device 122, display 118 may all be characterized as "modules" herein.

The modules may include hardware circuitry, single or multi-processor circuits, memory circuits, software program modules and objects, firmware, and combinations thereof, as desired by the architect of the architecture 10 and as appropriate for particular implementations of various embodiments.

The apparatus and systems of various embodiments may be useful in applications other than ES element configuration. They are not intended to serve as a complete description of all the elements and features of apparatus and systems that might make use of the structures described herein.

In one example embodiment, an enterprise system (ES) comprises a first ES module for a first ES and a second ES module for a second ES. The first ES module for the first ES includes a first plurality of configurable elements and a first configuration module to enable the configuration of the first plurality of configurable elements. The second ES module for the second ES includes a second configuration module to generate a configuration element information (CEI) message for the first ES, the CEI message including an indication of the configuration of at least one of the second plurality of configurable elements, the configuration of the at least one of the second plurality of the configurable elements affecting the configuration of at least one of the first plurality of configurable elements. In some instances, the first ES module further includes a plurality of master models, each master model having a first plurality of configurable elements and the first configuration module to enable selection of one of the plurality of master models. In these instances, the first configuration module may configure the at least one of the first plurality of configurable elements as a function of the CEI message including an indication of the configuration of the at least one of the second plurality of configurable elements.

In another example embodiment, an article includes a machine-accessible medium having associated information, wherein the information, when accessed, results in a machine performing operations comprising, at a first ES module for a first ES including a first plurality of configurable elements, configuring one of the first plurality of configurable elements. The operations further comprising at a second ES module for a second ES, generating a configuration element information (CEI) message for the first ES, the CEI message including an indication of the configuration of the at least one of the second plurality of configurable elements, the configuration of the at least one of the second plurality of configurable elements affecting the configuration of at least one of first plurality of configurable elements. In some instances, the information, when accessed, results in a machine further performing, at the second ES module, generating a CEI message for the first ES, the CEI message including an indication of the configuration of the at least one of the second plurality of configurable elements based on a selection of one of the plurality of master models. In other instances, the information, when accessed, results in a machine further performing, at the first ES module, configuring the one of the first plurality of configurable elements as a function of the CEI message including an indication of the configuration of the at least one of the second plurality of configurable elements.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., mp3 players), vehicles, medical devices (e.g., heart monitor, blood pressure monitor, etc.) and others. Some embodiments may include a number of methods.

It may be possible to execute the activities described herein in an order other than the order described. Various activities described with respect to the methods identified herein can be executed in repetitive, serial, or parallel fashion.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as JAVA® programming language by Sun Microsystems of Santa Clara, Calif., a subsidiary of Oracle Corporation of Redwood Shores, Calif. or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:
1. A first enterprise system (ES) comprising:
   a plurality of configurable elements, a configuration of a first configurable element of the plurality of configurable elements affecting a configuration of a second configurable element of a second ES, the first configurable element including a configurable attribute of a configuration parameter where an object of the configuration parameter is a document or a process; and a configuration module, using one or more processors, to configure at least a portion of the plurality of the configurable elements of the first ES based on a configuration of the first configurable element and to generate a configuration element information (CEI) message for the second ES, the CEI message including an indication of the configuration of the first configurable element of the first ES.

2. The first ES system of claim 1, further including a plurality of master models, each master model having at least a portion of the plurality of configurable elements and the configuration module being further to select one of the plurality of master models.

3. The first ES system of claim 2, wherein a first master model of the plurality of master models is based on a guideline published by a standardization organization.

4. The first ES system of claim 1, wherein the CEI message includes an indication of a selection of one of a plurality of master models.

5. The first ES system of claim 4, wherein the configuration module is further to configure the portion of the configurable elements based on the indication of the selection of the one of the plurality of the master models included in the CEI message.

6. The first ES system of claim 1, wherein the configuration module is further to not include at least one of the configurable elements.

7. The first ES system of claim 6, wherein the at least one not included configurable element is a step of the process.

8. The first ES system of claim 6, wherein the at least one not included configurable element is a field of the document.

9. A system, comprising:
a first enterprise system (ES) comprising:
a first plurality of configurable elements; and
a first configuration module, having one or more processors, to configure a first portion of the first plurality of the configurable elements of the first ES based on a configuration of a first configured element, the first portion of the first plurality first configurable elements including a configurable attribute of a configuration parameter where an object of the configuration parameter is a document or a process; and
a second ES, the second ES including a second configuration module to generate a configuration element information (CEI) message for the first ES, the CEI message including an indication of the configuration of a second configured element of a second plurality of configurable elements of the second ES, the configuration of the second configured element affecting a configuration of at least one of the first plurality of configurable elements of the first ES.

10. The system of claim 9, wherein the first ES further comprises a plurality of master models, each master model having at least a portion of the first plurality of configurable elements and the first configuration module further to enable selection of one of the plurality of master models.

11. The system of claim 10, wherein the first configuration module is further to configure a second portion of the first plurality of configurable elements based on the CEI message.

12. The system of claim 9, further comprising a collaboration module coupled to the first ES and the second ES, the collaboration module to negotiate a message format of messages passed between the first ES and the second ES.

13. The system of claim 12, wherein the collaboration module is further to format a first message received from the first ES according to the message format and to transmit the formatted message to the second ES.

14. A method, comprising:
at a first enterprise system (ES) including a first plurality of configurable elements, configuring a configurable element of the first plurality of configurable elements, the configurable element including a configurable attribute of a configuration parameter where an object of the configuration parameter is a document or a process; and
at a second ES, generating, using one or more processors, a configuration element information (CEI) message for the first ES, the CEI message including an indication of the configuration of a configured element of a second plurality of configurable elements of the second ES, the configuration of the configured element affecting the configuration of the configurable element of the first ES.

15. The method of claim 14, the first ES further including a plurality of master models, each master model having at least a portion of the first plurality of configurable elements and the method further comprising receiving a selection of one of the plurality of master models.

16. The method of claim 15, wherein the configured element is based on a selection of one of the plurality of master models.

17. The method of claim 14, further comprising, at the first ES, re-configuring the configurable element based on the CEI message.

18. An article including a non-transitory machine-accessible medium storing associated information, wherein the information, when accessed, results in a machine performing operations comprising:
at a first enterprise system (ES) including a first plurality of configurable elements, configuring a first configurable element of the first plurality of configurable elements, the first configurable element including a configurable attribute of a configuration parameter where an object of the configuration parameter is a document or a process; and
at a second ES, generating a configuration element information (CEI) message for the first ES, the CEI message including an indication of the configuration of a configured element of a second plurality of configurable elements of the second ES, the configuration of the configured element affecting the configuration of the first configurable element of the first ES.

19. The article of claim 18, wherein the first ES further includes a plurality of master models, each master model having at least a portion of the first plurality of configurable elements the operations further comprising receiving a selection of one of the plurality of master models.

20. The article of claim 19, wherein the CEI message is generated based on a selection of one of the plurality of master models.

21. The article of claim 18, the operations further comprising re-configuring the configurable element based on the CEI message.

* * * * *